US009338530B2

(12) United States Patent
Izenberg et al.

(10) Patent No.: US 9,338,530 B2
(45) Date of Patent: *May 10, 2016

(54) VERSATILE OPTICAL NETWORK INTERFACE METHODS AND SYSTEMS

(71) Applicant: Marvell Israel (M.I.S.L) Ltd., Yokneam (IL)

(72) Inventors: Erez Izenberg, Tel Aviv (IL); Oren Ben-Hayune, Petach Tikva (IL); Erez Amit, Chandler, AZ (US); Dimitry Melts, Cupertino, CA (US); Arie Elias, Cochav Yair (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,204

(22) Filed: Jan. 22, 2014

(65) Prior Publication Data

US 2014/0133854 A1    May 15, 2014

Related U.S. Application Data

(63) Continuation of application No. 13/047,286, filed on Mar. 14, 2011, now Pat. No. 8,693,868.

(60) Provisional application No. 61/314,332, filed on Mar. 16, 2010.

(51) Int. Cl.
*H04J 14/00*  (2006.01)
*H04J 3/16*   (2006.01)
*H04Q 11/00*  (2006.01)

(52) U.S. Cl.
CPC ........... *H04Q 11/0067* (2013.01); *H04Q 11/00* (2013.01)

(58) Field of Classification Search
CPC ............................ H04Q 11/0067; H04Q 11/00
USPC ........................................... 398/43, 45, 66, 67
See application file for complete search history.

(56) References Cited

U.S. PATENT DOCUMENTS 7,492,761 B1 *  2/2009  Farr .................... H04Q 3/0066
                                                370/389
7,606,489 B2 * 10/2009  Chen .................. H04J 14/0227
                                                 398/58

(Continued)

FOREIGN PATENT DOCUMENTS

CN          101355388 A      1/2009

OTHER PUBLICATIONS

Combined Chinese Office Action and Search Report issued Oct. 29, 2014 in Patent Application No. 201110065756.0 with English Translation and English Translation of Category of Cited Documents.

(Continued)

*Primary Examiner* — Oommen Jacob

(57) ABSTRACT

Methods and systems for implementing versatile optical terminals that detect optical transmission protocols and subsequently adapt to the correct protocol are disclosed. In an embodiment, an interface device for providing an interface for a first network with a passive optical network (PON) is disclosed. The interface device includes a protocol detection circuit for determining whether optical communication signals received from the PON conform to a first optical communication protocol, and a switchover control circuit that reconfigures the interface device to work with a second optical communication protocol when the received optical communication signals do not conform to the first optical communication protocol.

9 Claims, 3 Drawing Sheets

(56) References Cited

U.S. PATENT DOCUMENTS

| | | | | |
|---|---|---|---|---|
| 7,706,693 B2* | 4/2010 | Nonaka | H04B 10/516 | 370/389 |
| 7,756,418 B2* | 7/2010 | Ofalt | H04B 10/077 | 356/73.1 |
| 8,285,142 B2* | 10/2012 | Zheng | H04J 3/1694 | 398/67 |
| 8,315,527 B2* | 11/2012 | Kimura | H04B 10/032 | 398/167.5 |
| 2004/0141759 A1* | 7/2004 | Stiscia | H04J 3/1682 | 398/168 |
| 2006/0133809 A1* | 6/2006 | Chow | H04J 3/1694 | 398/66 |
| 2006/0153222 A1* | 7/2006 | Van Caenegem et al. | 370/445 | |
| 2006/0187960 A1* | 8/2006 | Murakami | H04L 67/1097 | 370/469 |
| 2007/0160371 A1* | 7/2007 | Irie | H04L 7/027 | 398/43 |
| 2007/0211763 A1* | 9/2007 | Solomon et al. | 370/498 | |
| 2007/0274717 A1* | 11/2007 | Xu | H04J 3/14 | 398/58 |
| 2007/0274718 A1* | 11/2007 | Bridges | H04J 3/1694 | 398/63 |
| 2008/0050116 A1* | 2/2008 | Nakaishi | H04J 3/0682 | 398/43 |
| 2008/0181212 A1* | 7/2008 | Curcio et al. | 370/389 | |
| 2008/0253293 A1* | 10/2008 | Beyers | H04L 43/024 | 370/242 |
| 2009/0010650 A1* | 1/2009 | Tsuchiya | H04J 3/0602 | 398/59 |
| 2009/0060531 A1* | 3/2009 | Biegert | H04L 12/2856 | 398/214 |
| 2009/0154920 A1* | 6/2009 | Yang | H04L 12/2861 | 398/17 |
| 2009/0208210 A1* | 8/2009 | Trojer | H04J 3/1617 | 398/58 |
| 2009/0245790 A1* | 10/2009 | Mizutani | H04J 14/0282 | 398/43 |
| 2010/0034534 A1* | 2/2010 | Niibe | H04J 3/0682 | 398/25 |
| 2010/0119240 A1* | 5/2010 | Feng | H04B 10/69 | 398/202 |
| 2010/0135657 A1* | 6/2010 | Eddleston | H04J 3/0688 | 398/44 |
| 2011/0116796 A1* | 5/2011 | Zheng | H04L 12/4633 | 398/45 |
| 2011/0135306 A1* | 6/2011 | Kim | H04J 3/0685 | 398/68 |
| 2011/0158639 A1* | 6/2011 | Spadaro | H04J 3/06 | 398/25 |
| 2011/0188857 A1* | 8/2011 | Zheng | H04L 12/6418 | 398/45 |
| 2011/0222866 A1* | 9/2011 | Mashimo | H04B 10/272 | 398/202 |
| 2011/0229131 A1* | 9/2011 | Izenberg | H04Q 11/0067 | 398/45 |
| 2011/0305458 A1* | 12/2011 | Zhou | H04J 3/1605 | 398/66 |

OTHER PUBLICATIONS

Office Action in Chinese Application No. 201110065756.0 dated Jul. 9, 2015 with English translation.

* cited by examiner

VERSATILE OPTICAL NETWORK INTERFACE METHODS AND SYSTEMS

INCORPORATION BY REFERENCE

This application is a continuation of U.S. patent application Ser. No. 13/047,286 filed on Mar. 14, 2011, which claims the benefit of U.S. Provisional Application No. 61/314,332, filed on Mar. 16, 2010. The disclosure of the prior applications is hereby incorporated by reference herein in their entireties.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Passive Optical Networks (PONs) are increasingly used to provide point-to-multipoint connectivity between a communications center and various residential and office networks. PON, architecture and data transmitted over a PON, are compliant with one of several different standards, for example BPON, EPON, G-PON, or 10G-PON. Conventional equipment, however, which is configured to process data transmitted in compliance with one type of PON is not suitable for processing data transmitted in compliance with a different type of PON.

SUMMARY

Various aspects and embodiments of the invention are described in further detail below.

In an example embodiment, an interface device for providing an interface for a first network with a passive optical network (PON) includes a protocol detection circuit configured to determine whether optical communication signals received from the PON conform to a first optical communication protocol, and a switchover control circuit configured to configure the interface device to work with a second optical communication protocol when the received optical communication signals do not conform to the first optical communication protocol.

In another example embodiment, a method for providing an interface for a first network with a passive optical network (PON) is disclosed. The method includes determining whether optical communication signals received from the PON conform to a first optical communication protocol, and configuring the interface to work with a second optical communication protocol when the received optical communication signals do not conform to the first optical communication protocol.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

For the purpose of this disclosure, the term "Ethernet Passive Optical Network", or "EPON", refers to an optical network that generally conforms to the Institute of Electrical and Electronic Engineers (IEEE) 802.3ah standard. Also for the purpose of this disclosure, the term "Gigabit Passive Optical Network", or "GPON", refers to an optical network that generally conforms to the International Telecommunications Union (ITU) G.984.x standard.

Figure 1:
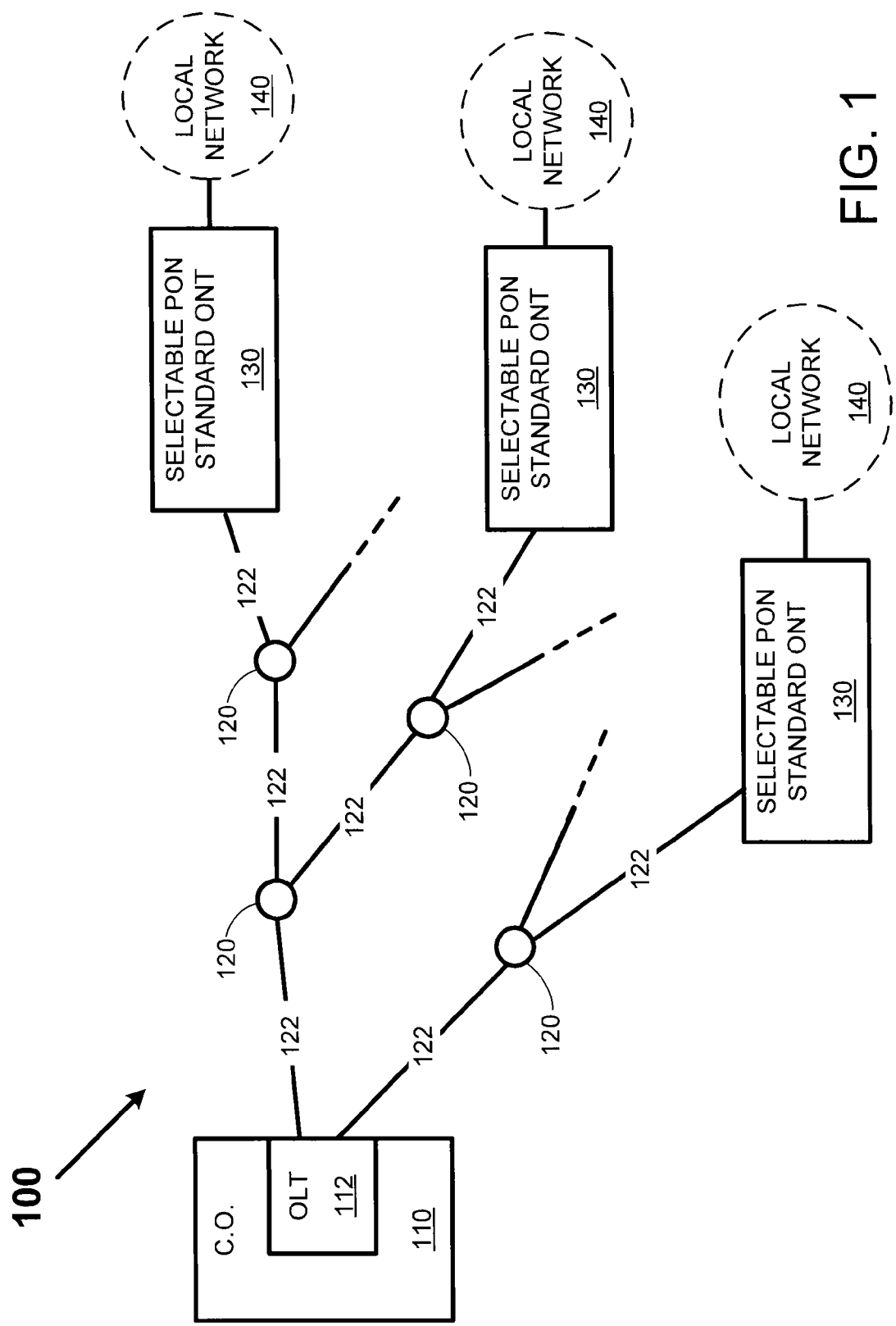
FIG. 1 depicts an example of a Passive Optical Network (PON) using selectable PON standard Optical Network Terminals (ONTs).

FIG. 1 schematically illustrates an example of a Passive Optical Network (PON) 100 in accordance with an embodiment of the disclosure using selectable PON standard Optical Network Terminals (ONTs) 130. The PON 100 includes a Central Office (C.O.) 110 having an Optical Line Terminal (OLT) 112 communicatively coupled to a number of local networks 140 via an optical network that includes fiber-optic cabling 122, optical splitters 120, and selectable PON standard ONTs 130 that are each coupled to a respective local network 140.

In operation, the OLT 112 is configured to send (downstream) optical communication signals to the selectable PON standard ONTs 130 via the fiber-optic cables 122 and optical splitters 120. The communication signals are configured to carry information, e.g., text files, voice data and other suitable media, as well as provide timing and status information. In turn, the selectable PON standard ONTs 130 send (upstream) basic information, timing information and status information to the OLT 112 using a Time Division Multiple Access (TDMA) protocol, for example.

Various standards making bodies, such as the IEEE and the ITU, have promulgated comparable but incompatible passive optical communications standards, of which EPON and GPON each constitute but one example. For example, in an embodiment, the physical infrastructure of fiber-optic cables 122 and optical splitters 120 support both EPON and GPON. Further, both EPON and GPON employ the same wavelength division multiplexing (WDM) scheme and wavelength plan that uses a 1490 nanometer (nm) wavelength for downstream traffic and a 1310 nm wavelength for upstream traffic. However, by way of example, because EPON and GPON (and other passive optical standards) respectively employ different upstream and downstream data rates, different frame times and different TDMA structures, a conventional ONT configured to process EPON compliant data would not be suitable for use in a GPON system. Similarly, a conventional ONT configured to process GPON compliant data would not be suitable for use in an EPON system. Thus, in accordance with an embodiment, the PON 100 of FIG. 1 includes one or more selectable PON standard ONTs 130 which are suitably configured to accommodate communication traffic that is compliant with one of at least two different PON standards.

Figure 2:
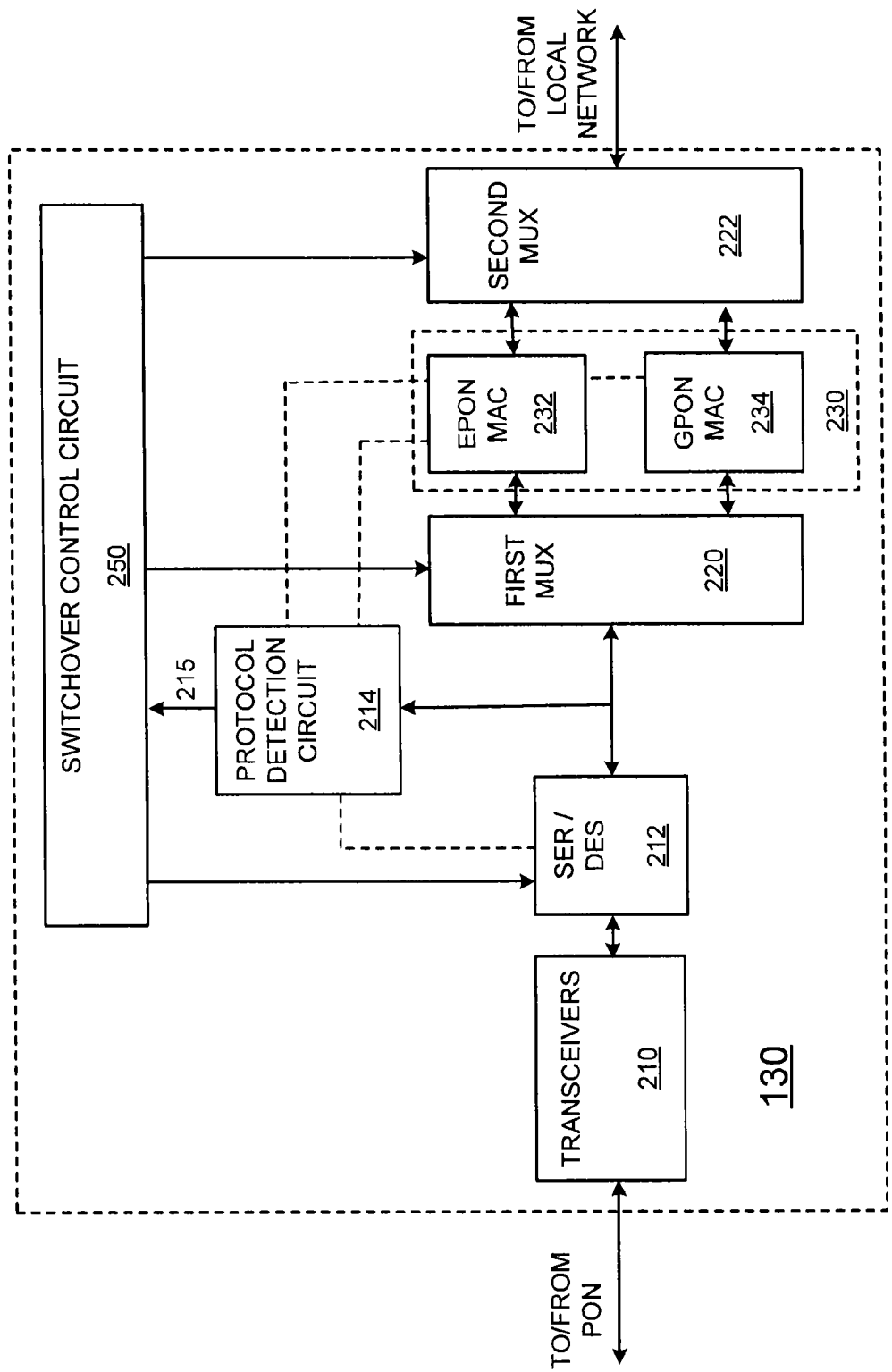
FIG. 2 depicts details of an Optical Network Terminal (ONT) of FIG. 1, in accordance with an embodiment.

FIG. 2 depicts details of a selectable PON standard ONT 130 of FIG. 1. In accordance with an embodiment, the selectable PON standard ONT 130 is configured to accommodate data that is transferred over PON 100 of FIG. 1 in accordance with one of the EPON and GPON standards. In an embodiment, the selectable PON standard ONT 130 of FIG. 2 is configured to detect the optical communication standard employed by an upstream OLT 112 of FIG. 1. In the embodiment, the selectable PON standard ONT 130 includes separate processing blocks each of which is configured to processes data that is transmitted over PON 100 in accordance with one of at least two PON standards, including the EPON and GPON standards. Then, in response to detecting the PON standard which is used in the PON 100, the selectable PON standard ONT 130 automatically configures (or reconfigures) itself to work with the appropriate optical communication standard. The selectable PON standard ONT 130 includes, for example, transceivers 210, a set of optical/electrical a serialization/de-serialization (SER/DES) circuit 212, a protocol detection circuit 214, a first multiplexer (MUX) 220, a second multiplexer (MUX) 222, a MAC layer module 230 that includes an EPON Media Access Control (MAC) device 232 and a GPON Media Access Control (MAC) device 234, and a switchover control circuit 250. While the example of FIG. 2 is presented merely in the context of the EPON and the GPON standards for simplicity of explanation, it is noted that in an embodiment, the concepts of FIG. 2 are adapted to extend to any number of other suitable optical network standards, including without limitation BPON, 10G-PON and the like.

In operation, the switchover control circuit 250 initially sends control signals to the SER/DES 212, the first MUX 220, and the second MUX 222 to configure the selectable PON standard ONT 130 to perform as one of an EPON-compliant or a GPON-compliant device. For example, the switchover control circuit 250 can configure the SER/DES to operate at a data rate compatible with the EPON standard, configure the first MUX 220, and the second MUX 222 to select the EPON MAC device 232, and reset and/or enable the EPON MAC device 232. Either PON standard (EPON and GPON in the example) may be selected upon initialization. As will be discussed below, if an incorrect PON standard is selected, selectable PON standard ONT 130 will be suitably reconfigured.

Next, in an embodiment, optical communication signals, such as optical signals corresponding to data packets that are compliant with either the EPON or GPON protocol, are received at the transceivers 210 where they are converted to electrical signals, and then supplied to the SER/DES 212.

The SER/DES 212, in turn, performs various operations, such as, for example, supporting serialization and de-serialization of data to/from the PON 100, as well as deriving protocol status information. According to an embodiment of the disclosure, the SER/DES 212 is configurable to work with various PON standards, such as the EPON protocol, the EPON protocol, and the like. For the present disclosure, the term "protocol status information" is used to refer to any form of information or signal that is suitable for identifying a particular communications protocol. For example, in an embodiment, the SER/DES 212 is configured to perform clock recovery for a GPON downstream signal, which operates at 2.48832 Gbps. Clock recovery is suitably accomplished, for example, using a Phase-Lock-Loop (PLL) and verified using a "lock/lost" signal. Accordingly, a "lock/lost" signal keyed to a 2.48832 Gbps signal can be used to identify a GPON compliant signal by feeding such a signal to the protocol detection circuit 214. Also, the SER/DES 212 provides frame information, such as a frame sync (PSYNC) field detected every 125 μS, to identify a GPON compliant signal.

Similarly, an EPON compliant signal might be detected, for example, using the above-mentioned clock recovery method for a 1.25 Gbps signal, by detecting the synchronization of the Ethernet Receive Physical Coding Sub-layer (RX PCS) field or by reception of certain Ethernet control packets, such as Multi-Point Control Protocol (MPCP) packets.

Data is supplied by the SER/DES 212 to one of the MAC devices 232 or 234. In an embodiment, the protocol detection circuit 214 keeps track of the protocol with which selectable PON standard ONT 130 is presently employed and whether incoming packets are compliant with that protocol. In an embodiment, the protocol detection 214 circuit receives the various protocol status information derived by the SER/DES 212, then determines whether the incoming signal is compliant with a presently used protocol (e.g. EPON, GPON or other) based on that information, and generates a suitable verification signal 215. In an embodiment, the verification signal simply is indicative of whether or not the optical communication signals received from the PON do or do not conform to the presently selected optical communication protocol. Alternatively, the verification signal 215 positively indicates the corresponding protocol with which an incoming packet is compliant. The verification signal 215 is provided to the switchover control circuit 250.

In an embodiment, inasmuch as the verification signal 215 indicates that the present protocol configuration of the selectable PON standard ONT 130 is suitable for handling received optical communication signals currently being transmitted on the PON, switchover control circuit 250 does not intervene in configuration of the selectable PON standard ONT 130. However, should the verification signal 215 indicate that the received optical communication signals do not conform to the presently selected optical communication protocol, switchover control circuit 250 causes the selectable PON standard ONT 130 to automatically reconfigure itself so as to be compliant with a different optical communication protocol. That is, in the embodiment seen in FIG. 2, the switchover control circuit 250 reconfigures the SER/DES 212 so as to work with the PON standard that is not presently selected, e.g., to operate a data rate compliant with a different PON standard, provides a suitable select signal to first MUX 220 so that incoming optical communication signals are provided to the selected MAC device 232 or 234, and provides a suitable select signal to second MUX 222 to receive the output from the selected MAC device 232 or 234. In an embodiment, each of the MAC devices 232 and 234, as well as optionally SER/DES 212, provides feedback to the protocol detection circuit 214 so as to test whether incoming optical communication signals indeed conform to a selected PON standard. In another embodiment, each of the MAC devices 232 and 234 provides information to the protocol detection circuit 214 so as enable the protocol detection circuit to select a PON standard without using a signal from the SER/DES 212.

In the example of FIG. 2, depiction of the selection is limited to selection between two different protocols for the purpose of conceptual clarity. Optionally, however, although not seen, switchover control circuit 250 is suitably configured to select among protocols different from the protocols shown or to select among a greater number of possible protocols. In such embodiment, the selectable PON standard ONT 130 includes a suitable number of processing circuits (such as MAC devices) and other processing elements such as multiplexers to accommodate selection from among greater than two protocols.

In the embodiment of FIG. 2, in the selectable PON standard ONT 130, the MAC layer module 230 includes separate MAC devices 232 and 234 each of which is capable of providing addressing and channel access control for one of a GPON or an EPON compliant system, respectively. In the example, each of the MAC devices 232 and 234 is a suitable dedicated hardware circuit module. As noted above, the MAC devices 232 and 234 are configured into (or out of) a path for processing incoming optical communication signals in response to a signal from the switchover control circuit 250. That is, in the embodiment seen in FIG. 2, either of the two separate MAC devices 232 or 234 is selected for use in response to being controllably multiplexed into the path downstream of SER/DES 212 by first MUX 220 and controllably demultiplexed to a local network by second MUX 222 in response to a select signal provided by the switchover control circuit 250. However, it is noted that, in an embodiment, the MAC layer module 230 can be made using a single MAC device, for example, by using a programmable hardware device that is suitably programmable by changing the content of tables that are used by the device or by using a software driven controller, which is capable of being selectively reconfigured to conform to both the EPON and GPON protocols in response to a control signal from the switchover control circuit 250.

Figure 3:
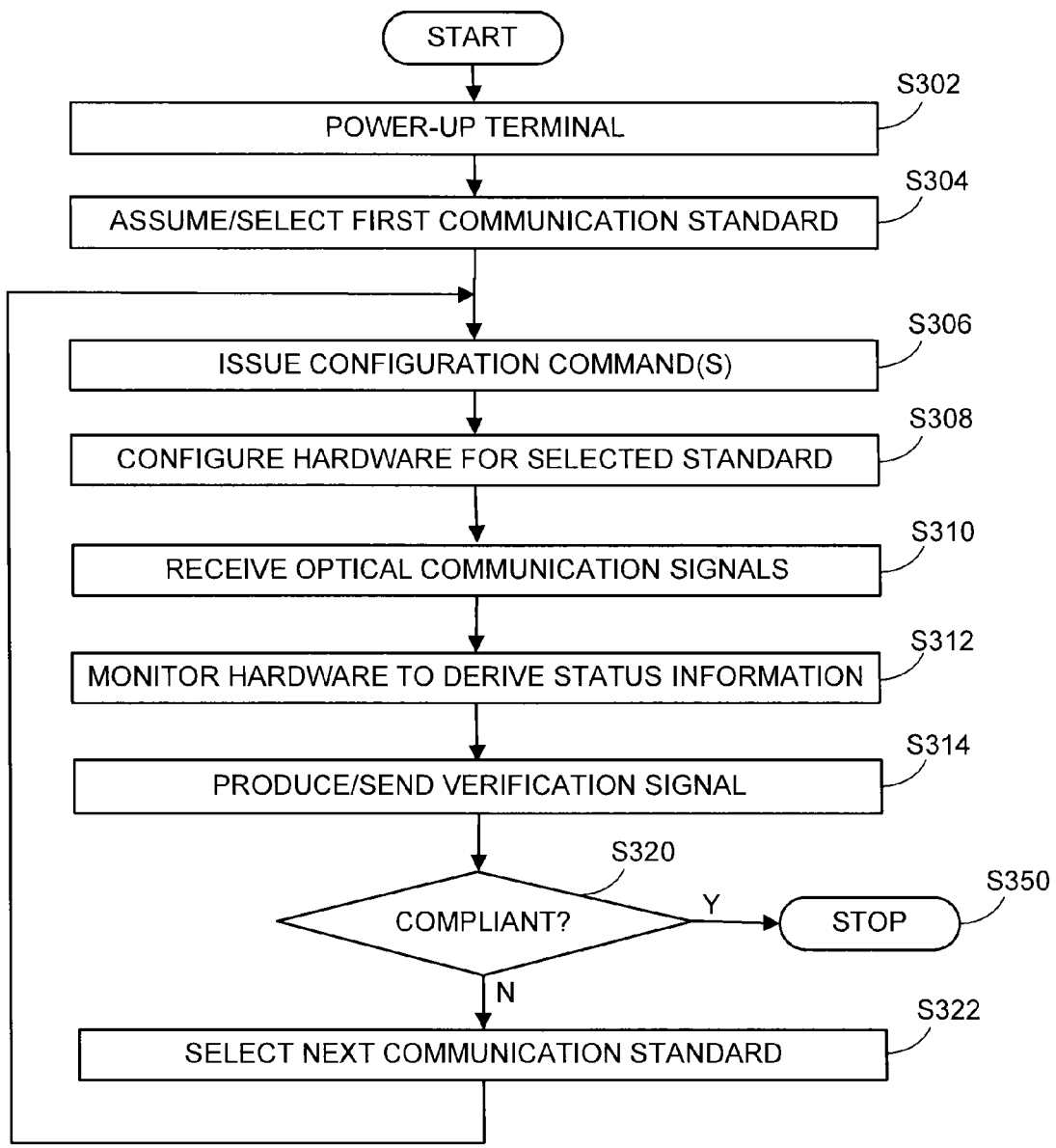
FIG. 3 is a flowchart outlining an example operation of the disclosed methods and systems for providing an interface between a local network and a PON.

FIG. 3 is a flowchart outlining an example of methods employed in systems for providing an interface between a local network, such as in a home or business, and optical networks that are potentially compliant with different communication standards. While the below-described operations are described as occurring in a particular sequence for convenience, it is noted that the order of various steps may be changed from embodiment to embodiment. It is further noted that some of the various listed steps may occur simultaneously or may occur in an overlapping fashion. Likewise, it is noted that multiple listed steps may be listed to describe the effects of a single event or action, and similarly a single listed step may be used to describe multiple events or actions.

In accordance with an embodiment of the present disclosure, the process starts in step S302 where a selectable PON standard ONT coupled to an optical network is powered up. Next, in step S304, a first optical communication standard, such as the GPON or EPON standards discussed above, is selected for initial use. Then, in step S306, various commands usable to configure the selectable PON standard ONT, e.g., commands usable to configure a SER/DES or MAC layer module, are issued to cause the selectable PON standard ONT to act in conformance with the selected communication standard. Control continues to step S308.

In step S308, the appropriate hardware of the selectable PON standard ONT is configured pursuant to the commands of step S306. Next, in step S310, optical communication signals from a PON are received. Then, in step S312, various hardware devices, such as the SER/DES and/or MAC layer module mentioned in step S306 are monitored to derive protocol status information. Control continues to step S314.

In step S314, the derived protocol status information of step S312 is used to produce a verification signal indicating whether or not the received optical communication signals are compliant with the selected communication standard to which the selectable PON standard ONT is presently configured. Next, in step S320, a determination is made as to whether the received optical communication signals are compliant with the selected communication standard. If the received optical communication signals are compliant, then the selectable PON standard ONT is considered properly configured, and so control jumps to step S350 where the reconfiguration process stops as the ONT continues to receive traffic from the PON; otherwise, control continues to step S322.

In step S322, a next communication standard is selected, and control jumps back to step S306 where steps S306-S322 are repeated until an appropriate communication standard is selected and the selectable PON standard ONT is appropriately configured. In the flow discussed above, configuration of a selectable PON standard ONT is verified upon power up, or otherwise when a communication session is commenced.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A network device for providing an interface for a first network with a passive optical network (PON), comprising:
    a receiver configured to receive optical communication signals from the PON;
    a protocol detection circuit configured to generate a verification signal that is indicative of whether the optical communication signals conform to an Ethernet passive optical network (EPON) communication protocol or a gigabit passive optical network (GPON) communication protocol based on protocol status information;
    a Media Access Control (MAC) layer module that includes a first MAC device supporting the EPON communication protocol and a second MAC device supporting the GPON communication protocol, both the first and second MAC devices being controllably multiplexed to the a serialization/de-serialization (SER/DES) circuit, and the Media Access Control (MAC) layer module is configured to provide addressing and channel access control for the EPON communication protocol or the GPON communication protocol in response to the verification signal; and
    a switchover control circuit that controls at least one multiplexer to cause one of the first or second MAC devices to be coupled with the SER/DES circuit in response to the verification signal.

2. The network device of claim 1, wherein:
    the SER/DES circuit supports serialization and de-serialization of data, and wherein the SER/DES is coupled to the PON and configured to derive the protocol status information from the received optical communication signals and provide the protocol status information to the protocol detection circuit.

3. A method for providing an interface for a first network with a passive optical network (PON), the method comprising:
    determining whether optical communication signals received from the PON conform to an Ethernet passive optical network (EPON) communication protocol by deriving protocol status information from a received optical communication signals and producing a verification signal based on the protocol status information; and
    configuring a serialization/de-serialization (SER/DES) circuit to operate with a gigabit passive optical network (GPON) communication protocol by multiplexing a MAC device that works with the GPON communication protocol to provide the addressing and channel access control for the GPON communication protocol when the received optical communication signals from the PON do not conform to the EPON communication protocol.

4. An optical network terminal device for providing an interface for a first network with a passive optical network (PON), comprising:
- a receiver configured to receive optical communication signals from the PON;
- a protocol detection circuit configured to generate a verification signal that is indicative of whether the optical communication signals conform to a gigabit passive optical network (GPON) communication protocol;
- a serialization/de-serialization (SER/DES) circuit that supports serialization and de-serialization of data; and
- a switchover control circuit that, when the verification signal indicates that the optical communication signals received from the PON do not conform to the GPON communication protocol, is configured to multiplex a first MAC device compliant with the GPON communication protocol out of a processing path with the SER/DES circuit for processing the optical communication signals and to multiplex a second MAC device compliant with an Ethernet passive optical network (EPON) communication protocol into the processing path with the SER/DES.

5. The optical network terminal device of claim 4, wherein:
the serialization/de-serialization (SER/DES) circuit is coupled to the PON and configured to derive protocol status information from the received optical communication signals and provide the protocol status information to the protocol detection circuit.

6. The optical network terminal device of claim 5, wherein the protocol detection circuit produces the verification signal based on the protocol status information.

7. The optical network terminal device of claim 4, further comprising a Media Access Control (MAC) layer module configured to provide addressing and channel access control for either the GPON communication protocol or the EPON communication protocol in response to a signal from the switchover control circuit.

8. The optical network terminal device of claim 7, wherein the MAC layer module includes two separate MAC devices controllably multiplexed to the SER/DES.

9. The optical network terminal device of claim 8, wherein the switchover control signal is configured to provide at least one multiplexer control signal to controllably multiplex the two separate MAC devices in response to the verification signal.

* * * * *